United States Patent [19]

Comollo

[11] 3,984,574

[45] Oct. 5, 1976

[54] NON-TACK CHEWING GUM COMPOSITION

[75] Inventor: Arthur J. Comollo, Edison Township, N.J.

[73] Assignee: Wm. Wrigley Jr. Company, Chicago, Ill.

[22] Filed: Apr. 11, 1975

[21] Appl. No.: 567,427

[52] U.S. Cl. .................................. 426/4; 426/6
[51] Int. Cl.² ................... A23G 3/30; A23G 3/00
[58] Field of Search .............................. 426/3–5

[56] References Cited
UNITED STATES PATENTS

| | | | |
|---|---|---|---|
| 1,807,704 | 6/1931 | Pappadis | 426/4 |
| 2,076,112 | 4/1937 | Barker | 426/4 |
| 2,197,719 | 4/1940 | Conner | 426/4 |
| 2,288,100 | 6/1942 | Manson | 426/4 |
| 2,383,145 | 8/1945 | Moose | 426/4 |
| 3,795,744 | 3/1974 | Ogawa et al. | 426/3 |

Primary Examiner—Jeanette M. Hunter
Attorney, Agent, or Firm—LeBlanc & Shur

[57] ABSTRACT

An inherently non-tacky chewing gum which does not adhere to dentures, fillings, or natural teeth is described. The chewing gum includes a base containing elastomers such as polyisobutylene, polyisoprene, isobutylene-isoprene copolymer or butadiene-styrene copolymer, present in from 5–35%; hydrogenated or partially hydrogenated vegetable oils or animal fats, present in from 5–50%; mineral adjuvants, present in from 5–40%; and polyvinyl acetate which may be present in up to 55%; fatty acids which may be present in up to 20%, and mono and diglycerides of fatty acids which may be present in up to 10%, by weight of the base composition.

47 Claims, No Drawings

NON-TACK CHEWING GUM COMPOSITION

This invention relates to novel chewing gum formulations, and in particular to a class of novel gum formulations which are inherently non-tacky or free without the addition of a special detackifier or abhesive agent. It has been discovered that the adhesion normally exhibited by conventional chewing gum compositions for natural tooth surfaces, dentures, fillings or the like, may be eliminated by substituting non-tacky ingredients in the chewing gum base for conventional ingredients or combinations thereof which have been found to produce the adhesive characteristics normally observed in conventional chewing gum formulations.

Conventional chewing gums exhibit an affinity for tooth surfaces referred to herein as adhesion. An absence of such affinity then is defined as abhesion. The adhesive characteristics of conventional chewing gum have been a limiting factor in the enjoyment thereof. In fact, many persons having dentures, restorations, fillings and the like are unable to chew conventional gums with any measure of enjoyment because of these adhesive characteristics.

Conventional gums tend to adhere most strongly to denture surfaces of methacrylate or related plastics. This adhesion is due to specific inter-facial forces, and is a phenomenon that depends upon the free energy of the surface. The adhesive attraction then is influenced by the wetability, the surface tension, and of course the nature and condition of the solid surface, i.e., whether the surface is pitted, jagged or roughened.

Conventional chewing gums are formulated with bases which may include natural gums such as Chicle or Jelutong, elastomers in combination with resins such as glycerol esters of rosin, waxes and mineral adjuvants. These compositions, however, all exhibit adhesive characteristics.

In addition, it has been proposed in the past to also use certain tack reducing additives and many different additives have been proposed to regulate or minimize the adhesive characteristics of conventional chewing gum bases.

For example, in my prior U.S. Pat. No. 3,255,018 the use of a gelatin-tannic acid adduct was proposed as an abhesive agent. Tannic acid was found to have the ability to reduce the adhesiveness of chewing gum. However, being water soluble, the tannic acid is quickly extracted during chewing, and ingested. Once the tannic acid has been extracted, the chewing gum returns to its normal adhesive condition. However, it was discovered that a gelatin-tannic acid adduct would permit a slow release of tannic acid from the chewing gum base to thereby regulate the extraction of tannic acid and prolong the adhesive characteristics of the chewing gum.

It has also been proposed in U.S. Pat. No. 2,273,425 to utilize ethyl cellulose; in U.S. Pat. No. 3,285,750 to use a fluorine containing polyolefin resin; and in U.S. Pat. No. 2,383,145, a mixture of terphenyls, as abhesive agents. Such materials a sulfur, minerals such as calcium carbonate; waxes; fats; soaps, oils, fatty acid amides, and the like have also been used as abhesive agents in the past, with varying degrees of success. See U.S. Pat. Nos. 2,429,664 and 3,440,060.

In the above instances, the addition of a special detackifier or abhesive agent met with varying degrees of success, and also created many problems. Certain of the agents were found to adversely affect the chew of the gum or the taste of the gum. Other agents were expensive or were corrosive in the base processing machinery. Also, in many instances, the agent was sufficiently water soluble to be extracted and consumed as the gum was chewed. Therefore after a period of chewing, the initially non-tacky gum became tacky.

It has now been discovered, however, that the adhesive characteristics of chewing gums are due to specific combinations of ingredients normally used in chewing gum base formulations. Therefore, if the tack producing combinations of ingredients are replaced by non-tack producing equivalents, a free or abhesive chewing gum formulation will be produced, according to the process of this invention.

It has specifically been discovered that three classes of materials which are normal constituents of chewing gum, in combination, account for the adhesive characteristics of chewing gum. These materials are elastomers, resins, and waxes.

On the other hand, it has been discovered that elastomers such as polyisobutylene, polyisoprene, isobutylene-isoprene copolymer, or butadiene-styrene copolymer when admixed with hydrogenated vegetable oils or animal fats, and polyvinyl acetate, fatty acids, or fatty acid esters produce compositions which do not adhere to natural teeth, artifical teeth, and dentures to any significant degree.

Specifically, it has been discovered that natural gums and natural or synthetic rubbers when admixed with a number of resins, such as rosin derivatives, polyvinyl acetate, and polyterpenes produce soft compositions having considerable tack to many substances. It has also been discovered that similar tacky compositions result with combinations of petroleum waxes, certain natural waxes, and natural gums, and natural or synthetic rubbers.

The non-tacky or abhesive chewing gum compositions of this invention then include elastomers such as polysiobutylene, polyisoprene, isobutylene-isoprene copolymer and the copolymer of butadiene and styrene; hydrogenated or partially hydrogenated vegetable oils such as soybean, cottonseed, corn, peanut, and palm, or animal fats such as tallow or lard; and mineral adjuvants such as calcium carbonate, talc and tricalcium phosphate. The compositions may also include polyvinyl acetate, fatty acids such as stearic and palmitic acids, and mono and diglycerides of these fatty acids.

Accordingly, it is an object of this invention to provide a class of abhesive chewing gum compositions which do not contain special detackifier additives.

It is another object of this invention to provide chewing gum compositions formulated from chewing gum base which will not markedly adhere to natural teeth, artificial teeth, dentures, restorations, and the like.

It is another object of this invention to eliminate the tack producing combination of components used in chewing gum and substitute nontack producing compounds therefor to produce abhesive chewing gum compositions.

It is yet another object of this invention to provide chewing gum bases for incorporation into chewing gum compositions which are not composed of combinations of natural gums, natural rubbers, synthetic rubbers, natural resins, modified natural resins, synthetic polymers and copolymers, microcrystalline and paraffin waxes, and the like which is combination produce chewing gum which will adhere to dental surfaces.

It is still another object of this invention to produce an abhesive chewing gum composition containing an elastomer softened and extended with hydrogenated or partially hydrogenated vegetable oils or fats.

It is yet another object of this invention to provide an abhesive chewing gum composition containing elastomers and polyvinyl acetate which composition is softened and extended with hydrogenated or partially hydrogenated vegetable oils or fats, fatty acids, and fatty acid esters together with mineral adjuvants, which composition will exhibit superior chewing characteristics and will be free to the teeth or dental surfaces.

These and other objects will become readily apparent with reference to the following description:

While the products of this invention achieve inherent abhesiveness or nontacky characteristics by the exclusion of certain conventional chewing gum components such as glycerol ester gums, waxes, or natural gums, an important feature of this invention lies in the discovery that certain combinations of ingredients as will be subsequently explained must be excluded in order to produce the class of nontacky, free, chewing gums of this invention. The essential components of this invention, as noted above, are certain elastomers, partially hydrogenated or hydrogenated vegetable oils or animal fats, and mineral adjuvants. In addition, the formulations may include polyvinyl acetate, fatty acids, and mono and diglyceride esters of fatty acids.

Specifically the elastomers used in the preferred embodiments of this invention are as follows:

Polyisobutylene, a preferred elastomer, is available from a variety of commercial suppliers. The embodiments of this invention may utilize both low molecular weight and high molecular weight polysiobutylene. The low molecular weight typically has a weight of from 6000 to 12,000, and the high molecular weight has a weight typically of from 40,000 to 120,000. The high molecular weight and the low molecular weight polyisobutylene may be utilized in embodiments of this invention alone or in combination.

A natural or synthetic rubber, polyisoprene, may also be utilized as the elastomeric ingredient in the composition of this invention. Polyisoprene is available in a variety of grades from many well known sources, and may be used alone or in combination with other elastomers.

A copolymer of isobutylene and isoprene is commercially produced by a number of suppliers and may be used as the sole elastomer or in combination with other elastomers.

Finally, a butadiene-styrene copolymer chewing gum grade synthetic rubber (SBR) may be utilized as the elastomeric ingredient. As will be well known to those skilled in the art, the aforementioned material is commercially available.

A wide variety of partially hydrogenated or hydrogenated vegetable oils may also be utilized in the product of this invention. For example, good results have been achieved with soybean, cottonseed, corn, peanut, and palm oil. In addition, animal fats such as tallow or lard may be utilized as desired. As will also be well known to those skilled in the art these material are commercially available from a variety of sources.

In addition, a variety of well known mineral adjuvants may be used in formulating the nontack chewing gum base of this invention. Preferred minerals are calcium carbonate, talc, and tricalcium phosphate. As will be well known to those skilled in the art similar materials may be substituted.

In addition to the aforementioned ingredients, certain embodiments of this invention include polyvinyl acetate (PVA) having a molecular weight of at least 2000. PVA is commercially available in various molecular weights, which could be utilized successfully in preferred embodiments of this invention.

The product of this invention may also include fatty acids such as stearic and palmitic acid, and mono and diglycerides of these fatty acids. These ingredients may be utilized alone, in combination with the fatty acids, or in substitution therefor.

As noted above, the elastomers are present in from 5–35%; the hydrogenated or partially hydrogenated vegetable oils or animal fats are present in from 5–50%; and the minerals are present from 5–40%. PVA may be present in up to 55%; the fatty acids may be present in up to 20%; and the mono and diglycerides of fatty acids may be present up to 10% of the chewing gum base compositions of this invention.

It should be emphasized that the products of this invention do not utilize the aforementioned combinations of conventional chewing gum components.

Natural gums are not combined with natural resins and rosin derivatives, and resins or waxes of petroleum origin. Natural gums are also not combined with natural or synthetic rubbers and resins such as rosin derivatives, PVA, and polyterpenes. In addition, natural gums are not combined with natural or synthetic rubbers and waxes of petroleum or natural origin. Finally, natural or synthetic rubbers are not combined with waxes and resins.

In each of the aforementioned instances the combination will produce an inherently adhesive chewing gum base, and substitution therefor with the components of this invention will produce an inherently abhesive chewing gum base.

Conventional methods are utilized in formulating the chewing gum base of this invention. These methods of formulation are well known to those skilled in the art. However, typically the high molecular weight elastomer and mineral components are admixed with the lower molecular weight elastomer, and added slowly to gradually extend the hard rubber. Then the PVA and small additions of the oils are added slowly to the batch.

The batch is then heated in a high shear or kneading mixer such as Sigma blade mixer slowly at a temperature of approximately 110° to 120°C., while mixing at constant heat for about 2–3 hours.

Fatty acids may be substituted for the oils or other hydrogenated fats or added in addition thereto. While PVA is a preferred component, the base of this invention may be made, as will be subsequently described, without PVA. High molecular weight elastomers are also preferred components, but as in the case of PVA, the base of this invention may be formulated in the absence thereof.

A wide variety of different types formulating methods and apparatii are well known to those skilled in the art, and the instant invention is not intended to be limited to a specific mixer, a specific mixing temperature, or a specific length of mixing time. These features are all well known to those skilled in the art.

The following are specific examples of preferred formulations of chewing gum base according to this invention.

| EXAMPLE I | Parts |
|---|---|
| Partially Hydrogenated Vegetable Oils | 17.00 |
| Hydrogenated Soybean Oil | 4.25 |
| Hydrogenated Cottonseed Oil | 4.25 |
| Mono and Diglycerides of Fatty Acids | 8.50 |
| Polyisobutylene Molecular Wt. 6–12M | 29.75 |
| Calcium Carbonate | 21.25 |

| EXAMPLE II | |
|---|---|
| Polyvinyl Acetate | 68.75 |
| Hydrogenated Soybean Oil | 2.50 |
| Calcium Carbonate | 31.25 |
| Hydrogenated Cottonseed Oil | 2.50 |
| Partially Hydrogenated Vegetable Oils | 1.25 |
| Polyisobutylene Molecular Wt. 6–12M | 6.25 |
| Polyisobutylene Molecular Wt. 40–120M | 6.25 |
| Fatty Acids Stearic-Palmitic | 6.25 |

| EXAMPLE III | |
|---|---|
| Fatty Acids Stearic-Palmitic | 7.60 |
| Partially Hydrogenated Vegetable Oils | 1.90 |
| Lecithin | 7.60 |
| Polyvinyl Acetate | 16.15 |
| Hydrogenated Cottonseed Oil | 7.60 |
| Calcium Carbonate | 38.00 |
| Polyisobutylene Molecular Wt. 6–12M | 9.50 |
| Polyisobutylene Molecular Wt. 40–120M | 6.65 |

| EXAMPLE IV | |
|---|---|
| Hydrogenated Soybean Oil | 14.00 |
| Mono and Diglycerides of Fatty Acids | 3.50 |
| Calcium Carbonate | 3.50 |
| Partially Hydrogenated Vegetable Oils | 7.00 |
| Polyvinyl Acetate | 21.00 |
| Polyisobutylene Molecular Wt. 6–12M | 3.50 |
| Polyisobutylene Molecular Wt. 40–120M | 10.50 |
| Fatty Acids Stearic-Palmitic | 7.00 |

| EXAMPLE V | |
|---|---|
| Calcium Carbonate | 32.50 |
| Hydrogenated Cottonseed Oil | 32.50 |
| Mono and Diglycerides of Fatty Acids | 6.50 |
| Hydrogenated Soybean Oil | 19.50 |
| Polyvinyl Acetate | 6.50 |
| Isobutylene-isoprene copolymer | 32.50 |

| EXAMPLE VI | |
|---|---|
| Polyvinyl Acetate | 27.36 |
| Hydrogenated Soybean Oil | 17.76 |
| Partially Hydrogenated Vegetable Oils | 10.56 |
| Calcium Carbonate | 14.40 |
| Polyisobutylene Molecular Wt. 6–12M | 20.28 |
| Isobutylene-isoprene copolymer | 10.80 |
| Mono and Diglycerides of Fatty Acids | 2.04 |
| Hydrogenated Cottonseed Oil | 16.80 |

| EXAMPLE VII | |
|---|---|
| Calcium Carbonate | 11.12 |
| Hydrogenated Cottonseed Oil | 9.60 |
| Mono and Diglycerides of Fatty Acids | 2.96 |
| Polyvinyl Acetate | 16.64 |
| Polyisobutylene Molecular Wt. 6–12M | 9.68 |
| Isobutylene-isoprene copolymer | 11.28 |
| Hydrogenated Soybean Oil | 10.16 |
| Partially Hydrogenated Vegetable Oils | 8.56 |

| EXAMPLE VIII | |
|---|---|
| Polyisoprene | 8.80 |
| Partially Hydrogenated Vegetable Oils | 5.50 |
| Hydrogenated Soybean Oil | 14.30 |
| Polyvinyl Acetate | 27.50 |
| Mono and Diglycerides of Fatty Acids | 6.60 |
| Polyisobutylene Molecular Wt. 6–12M | 8.80 |
| Polyisobutylene Molecular Wt. 40–120M | 11.00 |
| Talc | 11.00 |
| Hydrogenated Cottonseed Oil | 11.00 |
| Hydrogenated Corn-Peanut-Palm Oils | 5.50 |

| EXAMPLE IX | |
|---|---|
| Mono and Diglycerides of Fatty Acids | 2.50 |
| Calcium Carbonate | 6.25 |
| Polyisoprene | 20.00 |
| Talc | 6.25 |
| Polyisobutylene Molecular Wt. 6–12M | 12.50 |
| Tricalcium Phosphate | 6.25 |
| Fatty Acids Stearic-Palmitic | 3.75 |
| Polyvinyl Acetate | 17.50 |
| Hydrogenated Corn-Peanut-Palm Oils | 50.00 |

| EXAMPLE X | |
|---|---|
| Partially Hydrogenated Vegetable Oils | 9.00 |
| Mono and Diglycerides of Fatty Acids | 2.43 |
| Polyisoprene | 8.91 |
| Hydrogenated Cottonseed Oil | 11.70 |
| Calcium Carbonate | 11.61 |
| Hydrogenated Soybean Oil | 12.60 |
| Polyvinyl Acetate | 19.80 |
| Polyisobutylene Molecular Wt. 6–12M | 13.95 |

| EXAMPLE XI | |
|---|---|
| Hydrogenated Soybean Oil | 16.80 |
| Polyisobutylene Molecular Wt. 6–12M | 18.60 |
| Mono and Diglycerides of Fatty Acids | 3.24 |
| Calcium Carbonate | 15.48 |
| Polyvinyl Acetate | 26.40 |
| Hydrogenated Cottonseed Oil | 15.60 |
| Butadiene-Styrene Copolymer | 11.88 |
| Partially Hydrogenated Vegetable Oils | 12.00 |

As noted in Example I above, a nontack base can be formulated according to the process of this invention utilizing low molecular weight polyisobutylene alone as the elastomeric component. In this instance the polyisobutylene and calcium carbonate are initially blended and subsequently the oils and fatty acids are added slowly with mixing.

As noted in Example III lecithin may also be incorporated in the chewing gum base of this invention if desired.

In Example V the elastomer component comprises isobutylene-isoprene copolymer, and is used with PVA. In Examples VI and VII the elastomer comprises isobutylene isoprene copolymer and low molecular weight polyisobutylene, also used with PVA. As also noted in Examples II, III, and IV, PVA may be added to a base formulation including both high and low molecular weight polyisobutylene if desired.

Polyisoprene may also be utilized with a mixture of high and low molecular weight polyisobutylene as shown in Example VIII or may be utilized with polyvinyl acetate and low molecular weight polyisobutylene as shown in Example IX and X.

Finally, SBR may also be used with low molecular weight polyisobutylene and PVA as desired.

The chewing gum bases formulated in each of the above Examples will produce, as is well known in the art, different chewing characteristics. However, they all have a common feature of nontack or abhesiveness which will not vary throughout the chew. The freeness of the chewing gum bases of this invention is not dependent upon an individual component or special additive which may be extracted from the base during chewing or which may affect the taste or chewing characteristics of the gum. Therefore, the nontack chewing gum base of this invention is suitable for formulation into any desired chewing gum composition such as stick chewing gum or candy-coated ball or pellet chewing gum or bubble gum according to well known principles of chewing gum technology.

A conventional stick gum formulation will contain approximately 18–20% base. The gum will normally be formulated by admixing from 55–65% confectioner's sugar and 17–20% corn syrup with the base.

As is well known in the art, dextrose may be used as a partial substitute for confectioner's sugar. Accordingly, 10–20% dextrose may be added to decrease the confectioner's sugar content by an equal amount. Glycerine is also present in from 0.3 to 0.5%, and the flavor added will account from 0.2 to 3.5% of the chewing gum composition.

Conventional procedures are utilized in order to formulate the compositions of this invention. Typically the chewing gum base is softened by working in a warm mixer, and the dextrose, corn syrup, and approximately two-thirds of the confectioner's sugar is added and thoroughly mixed with the softened base. When these ingredients are well mixed the glycerine, flavor, and balance of the sugar is added. As soon as the last ingredients are thoroughly mixed the batch is discharged, allowed to cool slightly, sheeted and scored in the usual fashion.

In order to formulate a candy-coated, pellet or ball chewing gum, the quantity of chewing gum base is normally increased from 5 to 10% and the quantity of sugar is decreased from 5 to 10% over the quantities used for stick gum. Accordingly, the base may be from 25–30% of the composition, and the sugar may account for from 42–52% thereof. The center will contain a like amount of corn syrup, flavor, and glycerine.

Typically the centers are admixed as described above, and after the centers are sheeted and cooled they are broken into individual pieces. A weighed quantity of centers is added to each of a plurality of coating pans. A sugar syrup and a gum arabic solution may be prepared in the usual fashion for the coating operation. Gum arabic may account for at least about 5% of the coating while the sugar will account for over 90% thereof. Flavor also may be added in the amount of approximately 0.2 to 3.5%.

The coating pans are rotated and the syrup-gum arabic mixture added to the centers. Warm air is used to dry the mixture on the centers. Flavor is added at approximate intervals during the coating operation. A second coat is then applied using only the sugar syrup, and additional coats are applied as desired. The finished pieces may then be polished with a small amount of Carnauba wax.

A conventional bubble gum formulation will contain approximately 16–20% base. The gum will normally be formulated by admixing from 55–65% confectioner's sugar and 20–25% corn syrup with the base. Dextrose, as noted above, may be added as a substitute for a portion of the confectioner's sugar, and glycerine will also be present in from about 0.3 to about 0.5%. The flavor will also account for from 0.2 to 3.5% of the bubble gum composition. A small amount of water from 0.3 to 0.5% may also be incorporated in the composition.

Conventional procedures are utilized in order to formulate the bubble gum composition of this invention. Typically, the gum base is softened by working in a warm mixer maintained at a temperature of, for example, about 122° F. All the corn syrup is then added along with about two-third of the sugar. When the ingredients are well mixed, water and glycerine are added, followed by the balance of the sugar. Finally, the flavor is incorporated. As soon as all ingredients have been thoroughly mixed, the batch is discharged, allowed to cool slightly, and formed into individual pieces of desired shapes and sizes, and scored in the usual fashion.

As will be obvious to those skilled in the art the chewing gum base of this invention may be incorporated with any chewing gum formulation technique in place of conventional chewing gum base to produce stick gum or candy-coated ball or pellet gum or bubble gum.

In order to evaluate the abhesive characteristics of the chewing gum base of this invention compositions representative of the above Examples were formulated as chewing gums and evaluated by human panel testing and by testing with a tack tester laboratory apparatus as will be subsequently explained.

The panel testing utilized panels of twelve and thirteen members each. The majority of panel members had acrylic dentures, restorations or the like. Those members without methacrylate or other common denture material utilized an artificial methacrylate tooth mounted on a peg and pressed into the gum while it was chewed. This device permitted evaluation of tackiness in the mouth enviroment in that after a period of chewing the methacrylate tooth could be removed from the gum and tackiness or adhesion observed.

Samples to be evaluated were presented two at a time to the panel members. To eliminate carry-over effects the first sample of each pair was chewed in the morning; the second was chewed in the afternoon of the same day. This procedure provided an interval of several hours and at least one meal between chewing. The panelists were instructed to chew each sample for a minimum period of 45 minutes, or until noticeable tack to methacyrlate surfaces was observed. In the latter case the panelist was requested to report the time of chewing before adhesion became apparent. One test sample was a chewing gum formulated from a representative base of this invention, and the second in each of three groups of tests was a different, commercially available chewing gum.

The freeness rating used by the panel members was as follows: A rating of 10 indicated that the chewing gum did not adhere to dentures. A rating of 9 indicated that it adhered slightly to dentures. A rating of 8 indicated adherence to dentures and that the adherence was objectionable. Finally, a rating of 7 or less indicated adherence to dentures, and that the adherence was very objectionable. Table I below indicates the results of panel tests as described above. It should be noted that chewing gum (a) in each case was the chewing gum of this invention while (b), (c), and (d) were well known commercially available gums.

TABLE I

| CHEWING GUMS TESTED | Abhesion Panel Chewing Test Composite Results | | | | | |
|---|---|---|---|---|---|---|
| | (a) | (b) | (a) | (c) | (a) | (d) |
| Frequency of Freeness Rating | | | | | | |
| 10 | 10 | 0 | 11 | 4 | 9 | 3 |
| 9 | 2 | 8 | 1 | 4 | 2 | 5 |
| 8 | 1 | 1 | 1 | 3 | 1 | 2 |
| 7 or less | 0 | 4 | 0 | 2 | 0 | 2 |
| Average Freeness Rating | 9.7 | 8.2 | 9.7 | 8.6 | 9.7 | 8.8 |
| % Free * | 77 | 0 | 85 | 31 | 75 | 25 |

* Percent of panel reporting complete freeness for a minimum of 45 minutes

The above evaluation of panel chewing test results clearly indicates that the chewing gums of this invention are significantly freer to acrylic surfaces than the comparison commercially available chewing gums.

The abhesive qualities of the chewing gums formulated according to this invention were also evaluated using a probe tack tester as follows:

The tack tester provides a means of bringing an acrylic dental probe into contact with masticated gum under controlled conditions of contact pressure and dwell time, the subsequently breaking the bond thus formed at a controlled rate. The force required to achieve this break is taken as the measure of tackiness.

An acrylic dental probe was conditioned by chewing a stick of test gum against it for 5 minutes. Then the masticated gum was quickly wrapped around a rigid support and the conditioned dental probe clamped to one plate of a conventional trip balance. A 500 gram weight was then placed on the plate supporting the dental probe so that the dental probe was urged against the masticated gum with a pressure of 500 grams. After 15 seconds the 500 gram weight was removed and additional weights were added to the opposite plate of the balance at a rate of about a gram per second till the dental probe separated from the masticated gum. The additional amount of weight was then recorded as the measure of tackiness.

After separation the dental probe was visibly examined. If the probe was completely free of any gum particles the test gum was recorded as being abhesive. If gum particles were seen adhering to the surface of the dental probe the test gum was recorded as being adhesive. After completion of the procedure for 5 minutes chewing the procedure was repeated for a 45 minute chewing test. The results of these tests are presented below in Table II.

In Table II as in Table I chewing gum (a) is a chewing gum formulated according to this invention. Chewing gums (b), (c), and (d) are the same three commercially available chewing gums utilized in the panel chewing test Table I above.

TABLE II

| CHEWING GUMS TESTED | Tackmeter Test Results | | | | | |
|---|---|---|---|---|---|---|
| | (a) | (b) | (a) | (c) | (a) | (d) |
| Tack Det'n. Value * After Chewing | | | | | | |
| 5 minutes | 6 | 22 | 6 | 36 | 6 | 33 |
| Type of severance | + | – | + | – | + | – |
| 45 minutes | 4 | 56 | 6 | 119 | 6 | 56 |
| Type of severance | + | – | + | – | + | – |

+ Abhesive
– Adhesive
* The force in grams required to separate the test gums from a methacrylate test tooth.

As shown above, the force in grams required to separate the test gums from the methacrylate test probe confirmed the results obtained from the panel chewing tests. Accordingly, a significantly greater degree of abhesive effectiveness is exhibited by chewing gum formulations utilizing the chewing gum base of this invention than other commercially available chewing gums.

In summary, it has been discovered that an inherently nontacky or abhesive chewing gum base may be formulated by eliminating conventional chewing gum base ingredients. Because combinations of certain conventional ingredients in chewing gum bases have been found to produce the tacky or adhesive condition normally associated with these bases, elimination of these ingredients and substitution of nontack producing ingredients will produce an inherently abhesive chewing gum without the use of a separate detackifier or abhesive ingredient in the gum base.

Specifically, it has been discovered that combinations of natural gums, natural resins, rosin derivatives and resins or waxes of petroleum origin; natural gums, natural or synthetic rubbers, and resins; and natural gums, natural or synthetic rubbers and waxes; or combinations of rubbers, waxes and resins produce inherently tacky chewing gum bases. Accordingly the chewing gum base of this invention uses from 5–35% elastomers, from 5–50% hydrogenated or partially hydrogenated vegetable oil or animal fats; and minerals in from 5–40% with polyvinyl acetate, fatty acids and mono and diglycerides of fatty acids to obtain an abhesive combination.

The chewing gum base formulations of this invention have been proven to be inherently nontacky or abhesive to dental surfaces, and therefore may be incorporated in any conventional chewing gum compositions to produce a nontacky or abhesive chewing gum. The base formulations of this invention have been found to be excellent ingredients adapted for use in stick gum formulations in place of any well known commercially available gum base formulations.

This invention then is not intended to be limited to the particular chewing gum composition utilized but is intended to encompass any chewing gum composition of the stick gum or candy-coated ball or pellet or bubble gum variety including a chewing gum base formulation of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An abhesive chewing gum composition including a chewing gum base consisting of a non-tack producing combination of ingredients, said base comprising: in admixture, an elastomer present in a concentration of from about 5 to about 35%; hydrogenated or partially hydrogenated oils of vegetable or animal origin present in a concentration of from about 5 to about 50%; mineral adjuvants present in a concentration of from about 5 to about 40%, polyvinyl acetate present in a concentration of up to about 55%; at least one member selected from the group consisting of fatty acids present in a concentration of up to about 20%, and mono or diglycerides of fatty acids present in a concentration of up to about 10%, each by weight of the total base composition.

2. The base of claim 1 wherein said hydrogenated or partially hydrogenated oils comprise vegetable oils selected from the group consisting of soybean, cottonseed, corn, peanut, and palm.

3. The base of claim 1 wherein said hydrogenated or partially hydrogenated oils of vegetable or animal origin comprise animal fats selected from the group consisting of tallow and lard.

4. The base of claim 1 wherein the fatty acids include a member selected from the group consisting of stearic and palmitic.

5. The base of claim 1 wherein the mono and diglycerides of fatty acids include a member selected from the group consisting of mono and diglycerides of stearic acid and palmitic acid.

6. The base of claim 1 wherein the elastomer is at least one member selected from the group consisting of high molecular weight polyisobutylene, low molecular weight polyisobutylene, isobutylene - isoprene copolymer, natural or synthetic polyisoprene, and butadiene-styrene copolymer.

7. The base of claim 1 wherein the elastomer comprises polyisobutylene having a molecular weight of from 6,000 to 12,000.

8. The base of claim 1 wherein the elastomer comprises polyisobutylene having a molecular weight of from 40,000 to 120,000.

9. The base of cliam 1 wherein the elastomer is a mixture of low molecular weight polyisobutylene having a molecular weight of from 6,000 to 12,000 and high molecular weight polyisobutylene having a molecular weight of from 40,000 to 120,000.

10. The base of claim 9 wherein said low and high molecular weight polyisobutylenes are present in equal parts by weight.

11. The base of claim 9 wherein said low and high molecular weight polyisobutylenes are present in a weight ratio of about 9.50 to 6.65, respectively.

12. The base of claim 9 wherein said low and high molecular weight polyisobutylenes are present in a weight ratio of 3.50 to 10.50, respectively.

13. The base of claim 9 wherein said low and high molecular weight polyisobutylenes are present in a weight ratio of 8.80 to 11.00, respectively.

14. The base of claim 1 wherein the elastomer is a copolymer of isobutylene and isoprene.

15. The base of claim 1 wherein the elastomer is a copolymer of isobutylene and isoprene in combination with low molecular weight polyisobutylene.

16. The base of claim 15 wherein said low molecular weight polyisobutylene and copolymer of isobutylene and isoprene are present in a weight ratio of about 20.28 to 10.80, respectively.

17. The base of claim 15 wherein said low molecular weight polyisobutylene and copolymer of isobutylene and isoprene are present in a weight ratio of 9.68 to 11.28, respectively.

18. The base of claim 1 wherein polyvinyl acetate is present, and has a molecular weight of at least 2,000.

19. The base of claim 1 wherein the mineral adjuvants comprise at least one member selected from the group consisting of calcium carbonate, talc, and tricalcium phosphate.

20. The base of claim 1 further comprising as an additional ingredient lecithin.

21. The base of claim 9 further comprising as an additional ingredient polyvinyl acetate having a molecular weight of at least 2,000.

22. The base of claim 10 further comprising as an additional ingredient polyvinyl acetate having a molecular weight of at least 2,000 present in a weight ratio of 68.75 to 6.25 parts of said elastomers, each.

23. The base of claim 11 further comprising as an additional ingredient polyvinyl acetate having a molecular weight of at least 2,000 present in a weight ratio of 16.15.

24. The base of claim 12 further comprising as an additional ingredient polyvinyl acetate having a molecular weight of an least 2,000 present in a weight ratio of 21.00.

25. The base of claim 16 further comprising as an additional ingredient polyvinyl acetate having a molecular weight of at least 2,000 present in a weight ratio of 27.36.

26. The base of claim 17 further comprising as an additional ingredient polyvinyl acetate hving a molecular weight of at least 2,000 present in a weight ratio of 16.64.

27. The base of claim 13 further comprising as an additional ingredient polyvinyl acetate having a molecular weight of at least 2,000 present in a weight ratio of 27.50.

28. The base of claim 1 wherein said elastomer is a mixture of polyisoprene and polyisobutylene having a molecular weight of from 6,000 to 12,000.

29. The base of claim 28 wherein said polyisoprene and polyisobutylene are present in a weight ratio of 20.00 to 12.50, respectively.

30. The base of claim 28 wherein said polyisoprene and polyisobutylene are present in a weight ratio of 8.91 to 13.95, respectively.

31. The base of claim 27 wherein said elastomer further comprises polyisoprene present in a weight ratio of 8.80.

32. The base of claim 29 further comprising polyvinyl acetate having a molecular weight of at least 2,000 present in a weight ratio of 17.50.

33. The base of claim 30 further comprising polyvinyl acetate having a minimum molecular weight of 2,000 present in a weight ratio of 19.80.

34. The base of claim 1 wherein said elastomer is a mixture of polyisobutylene having a molecular weight of from 6,000 to 12,000 and butadiene-styrene copolymer.

35. The base of claim 34 wherein said polyisobutylene and butadiene-styrene copolymer are present in a weight ratio of 18.60 to 11.88, respectively.

36. The base of claim 35 comprising as an additional ingredient polyvinyl acetate having a molecular weight of at least 2,000 present in a weight ratio of 26.40.

37. An abhesive chewing gum composition including a chewing gum base consisting of a non-tack producing combination of ingredients, said base comprising, in approximate parts by weight, an admixture of 17.00 parts of at least one partially hydrogenated vegetable oil selected from the group consisting of soybean, cottonseed, corn, peanut, and palm; 4.25 parts of hydrogenated soybean oil; 4.24 parts of hydrogenated cottonseed oil; 8.50 parts of a mono and diglyceride of at least one fatty acid selected from the group consisting of stearic and palmitic; 29.75 parts of polyisobutylene having a molecular weight of from 6,000 to 12,000; and 21.25 parts calcium cabonate.

38. An abhesive chewing gum composition including a chewing gum base consisting of a non-tack producing combination of ingredients, said base comprising, in approximate parts by weight, an admixture of 68.75 parts polyvinyl acetate having a molecular weight of at least 2,000; 2.50 parts hydrogenated soybean oil; 31.25 parts calcium carbonate; 2.50 parts hydrogenated cottonseed oil; 1.25 parts of at least one partially hydrogenated vegetable oil selected from the group consisting of soybean, cottonseed, corn, peanut, and palm; 6.25 parts polyisobutylene having a molecular weight of from 6,000 to 12,000; 6.25 parts polyisobutylene having a molecular weight of from 40,000 to 120,000; and 6.25 parts of at least one fatty acid selected from the group consisting of stearic and palmitic.

39. an abhesive chewing gum composition having a chewing gum base consisting of a non-tack producing combination of ingredients, said base comprising, in approximate parts by weight, an admixture of 7.60 parts of at least one fatty acid selected from a group consisting of stearic and palmitic; 1.90 parts of at least one partially hydrogenated vegetatble oil selected from the group consisting of soybean, cottonseed, corn, peanut, and palm; 7.60 parts lecithin; 16.15 parts polyvinyl acetate having a molecular weight of at least 2,000; 7.60 parts hydrogenated cottonseed oil; 38.00 parts calcium carbonate; 9.50 parts polyisobutylene having a molecular weight of from 6,000 to 12,000 and 6.65 parts polyisobutylene having a molecular weight of from 40,000 to 120,000.

40. An abhesive chewing gum composition including a chewing gum base consisting of a non-tack producing combination of ingredients, said base comprising, in approximate parts by weight, an admixture of 14.00 parts hydrogenated soybean oil; 3.50 parts of at least one mono digylceride of fatty acid selected from the group consisting of stearic and palmitic; 3.50 parts calcium carbonate; 7.00 parts of at least one partially hydrogenated vegetable oil selected from the group consisting of soybean, cottonseed, corn, peanut and palm; 21.00 parts polyvinyl acetate having a molecular weight of at least 2,000; 3.50 parts polyisobutylene having a molecular weight of from 6,000 to 12,000; 10.50 parts polyisobutylene having a molecular weight of from 40,000 to 120,000; and 7.50 parts of at least one fatty acid selected from the group consisting of stearic and palmitic.

41. An abhesive chewing gum composition including a chewing gum base consisting of a non-tack producing combination of ingredients, said base comprising, in approximate parts by weight, an admixture of 32.50 parts calcium carbonate; 32.50 parts hydrogenated cottonseed oil; 6.50 parts of a mono and diglyceride of a fatty acid selected from the group consisting of stearic and palmitic; 19.50 parts hydrogenated soybean oil; 6.50 parts polyvinyl acetate having a molecular weight of at least 2,000; 32.50 parts isobutylene-isoprene copolymer.

42. An abhesive chewing gum composition including a chewing gum base consisting of a non-tack producing combination of ingredients, said base comprising, in approximate parts by weight, an admixture of 27.36 parts polyvinyl acetate having a molecular weight of at least 2,000; 17.76 parts hydrogenated soybean oil; 10.56 parts of a partially hydrogenated vegetable oil selected from the group consisting of soybean, cottonseed, corn, peanut and palm; 14.40 parts calcium carbonate; 20.28 parts polyisobutylene having a molecular weight of from 6,000 to 12,000; 10.80 parts isobutylene-isoprene copolymer; 2.04 parts of a mono and diglyceride of a fatty acid selected from the group consisting of stearic and palmitic; 16.80 parts hydrogenated cottonseed oil.

43. An abhesive chewing gum composition including a chewing gum base consisting of a non-tack producing combination of ingredients, said base comprising, in approximate parts by weight, an admixture of 11.12 parts calcium carbonate; 9.60 parts hydrogenated cottonseed oil; 2.96 parts of at least one mono and diglyceride of a fatty acid selected from the group consisting of stearic and palmitic; 16.64 parts polyvinyl acetate having a molecular weight of at least 2,000; 9.68 parts polyisobutylene having a molecular weight of from 6,000 to 12,000; 11.28 parts isobutylene-isoprene copolymer; 10.16 parts hydrogenated soybean oil; 8.56 parts of a partially hydrogenated vegetable oil selected from the group consisting of soybean, cottonseed, corn, peanut and palm.

44. An abhesive chewing gum composition including a chewing gum base consisting of a non-tack producing combination of ingredients, said base comprising, in approximate parts by weight, an admixture of 8.80 parts polyisoprene; 5.50 parts of a partially hydrogenated vegetable oil selected from the group consisting of soybean, cottonseed, corn, peanut, and palm; 14.30 parts hydrogenated soybean oil; 27.50 parts polyvinyl acetate having a molecular weight of at least 2,000; 6.60 parts of at least one mono and diglyceride of a fatty acid selected from the group consisting of stearic and palmitic; 8.80 parts polyisobutylene having a molecular weight of from 6,000 to 12,000; 11.00 parts polyisobutylene having a molecular weight of 40,000 to 120,000; 11.00 parts talc; 11.00 parts hydrogenated cottonseed oil; and 5.50 parts of a hydrogenated oil selected from the group consisting of corn, peanut, and palm.

45. An abhesive chewing gum composition including a chewing gum base consisting of a non-tack producing combination of ingredients, said base comprising, in approximate parts by weight, an admixture of 2.50 parts of at least one mono and diglyceride of a fatty acid selected from the group consisting of stearic and palmitic; 6.25 parts calcium carbonate; 20.00 parts polyisoprene; 6.25 parts talc; 12.50 parts polyisobutylene having a molecular weight of from 6,000 to 12,000; 6.25 parts tricalcium phosphate; 3.75 parts of a fatty acid selected from the group consisting of stearic and palmitic; 17.50 parts polyvinyl acetate having a molecular weight of at least 2,000; and 50.00 parts of at least one hydrogenated oil selected from the group consisting of cotton, corn, peanut, and palm.

46. An adhesive chewing gum composition including a chewing gum base consisting of a non-tack producing combination of ingredients, said base comprising, in approximate parts by weight, an admixture of 9.00 parts of at least on partially hydrogenated vegetable oil selected from the group consisting of soybean, cottonseed, corn, peanut and palm; 2.43 parts of at least one mono and diglyceride of a fatty acid selected from the group consisting of stearic and palmitic; 8.91 parts polyisoprene; 11.70 parts hydrogenated cottonseed oil; 11.61 parts calcium cabonate; 12.60 parts hydrogenated soybean oil; 19.80 parts polyvinyl acetate having a molecular weight of at least 2,000; and 13.95 parts of polyisobutylene having a molecular weight of from 6,000 to 12,000.

47. An abhesive chewing gum composition including a chewing gum base consisting of a non-tack producing combination of ingredients, said base comprising, in approximate parts by weight, an admixture of 16.80 parts hydrogenated soybean oil; 18.60 parts polyisobutylene having a molecular weight of from 6,000 to 12,000; 3.24 parts of at least one mono and diglyceride of a fatty acid selected from the group consisting of stearic and palmitic; 15.48 parts calcium carbonate; 26.40 parts polyvinyl acetate having a molecular weight of at least 2,000; 15.60 parts of hydrogenated cottonseed oil; 11.88 parts butadienestyrene copolymer; and 12.00 parts of at least one partially hydrogenated vegetable oil selected from the group consisting of soybean, cottonseed, corn, peanut, and palm.

\* \* \* \* \*

UNITED STATES PATENT AND TRADEMARK OFFICE
CERTIFICATE OF CORRECTION

PATENT NO. : 3,984,574
DATED : October 5, 1976
INVENTOR(S) : Arthur J. Connollo

It is certified that error appears in the above-identified patent and that said Letters Patent are hereby corrected as shown below:

Column 1, line 60, "a sulfur" should read --as sulfur--.

Column 2, line 67, "is" should read --in--.

Column 9, line 11, "the subsequently" should read --and subsequently--.

Column 11, line 20, "cliam" should read --claim--.

Column 12, line 3, "an least" should read --at least--.

Column 12, line 52, "4.24" should read --4.25--.

Column 13, line 24, "digylceride" should read --diglyceride--.

Column 14, line 39, "adhesive" should read --abhesive--.

Signed and Sealed this

Twenty-ninth Day of March 1977

[SEAL]

Attest:

RUTH C. MASON
Attesting Officer

C. MARSHALL DANN
Commissioner of Patents and Trademarks